United States Patent
John et al.

(10) Patent No.: US 8,141,336 B1
(45) Date of Patent: Mar. 27, 2012

(54) COMBINED CYCLE POWER AUGMENTATION BY EFFICIENT UTILIZATION OF ATOMIZING AIR ENERGY

(75) Inventors: Joseph John, Chennai (IN); Jegadeesan Maruthamuthu, Dindigul (IN); Sudhahar Rajan, Tirunelveli (IN); Venugopala Durwasula Raju, Kadapa (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/877,427

(22) Filed: Sep. 8, 2010

(51) Int. Cl.
*F02C 6/00* (2006.01)
(52) U.S. Cl. ........................ 60/39.182; 60/728
(58) Field of Classification Search ............ 60/339.182, 60/39.5, 39.511, 728
See application file for complete search history.

(56) References Cited

U.S. PATENT DOCUMENTS

| | | | | |
|---|---|---|---|---|
| 4,896,499 A | * | 1/1990 | Rice | 60/792 |
| 5,313,782 A | * | 5/1994 | Frutschi et al. | 60/39.17 |
| 5,457,951 A | * | 10/1995 | Johnson et al. | 60/780 |
| 5,664,414 A | * | 9/1997 | Bronicki et al. | 60/39.182 |
| 5,758,502 A | * | 6/1998 | Utamura et al. | 60/728 |
| 6,198,786 B1 | * | 3/2001 | Carroll et al. | 376/211 |
| 7,644,573 B2 | | 1/2010 | Smith et al. | |
| 7,730,712 B2 | | 6/2010 | Sharma et al. | |
| 2002/0078689 A1 | * | 6/2002 | Coleman et al. | 60/728 |
| 2007/0017207 A1 | | 1/2007 | Smith et al. | |

* cited by examiner

*Primary Examiner* — Louis Casaregola
*Assistant Examiner* — Phutthiwat Wongwian
(74) *Attorney, Agent, or Firm* — Dority & Manning, P.A.

(57) ABSTRACT

A combined cycle power plant includes a gas turbine having a first compressor, a second compressor downstream of the first compressor, and a regenerative heat exchanger between the first and second compressors. A steam generator is downstream of the gas turbine and receives exhaust from the gas turbine. A closed loop cooling system through the regenerative heat exchanger and the steam generator transfers heat from the regenerative heat exchanger to the steam generator. A method for operating a combined cycle power plant includes compressing a working fluid in a compressor and cooling the compressed working fluid with a regenerative heat exchanger so as to create a cooled compressed working fluid. The method further includes transferring heat from the regenerative heat exchanger to a steam generator.

13 Claims, 1 Drawing Sheet

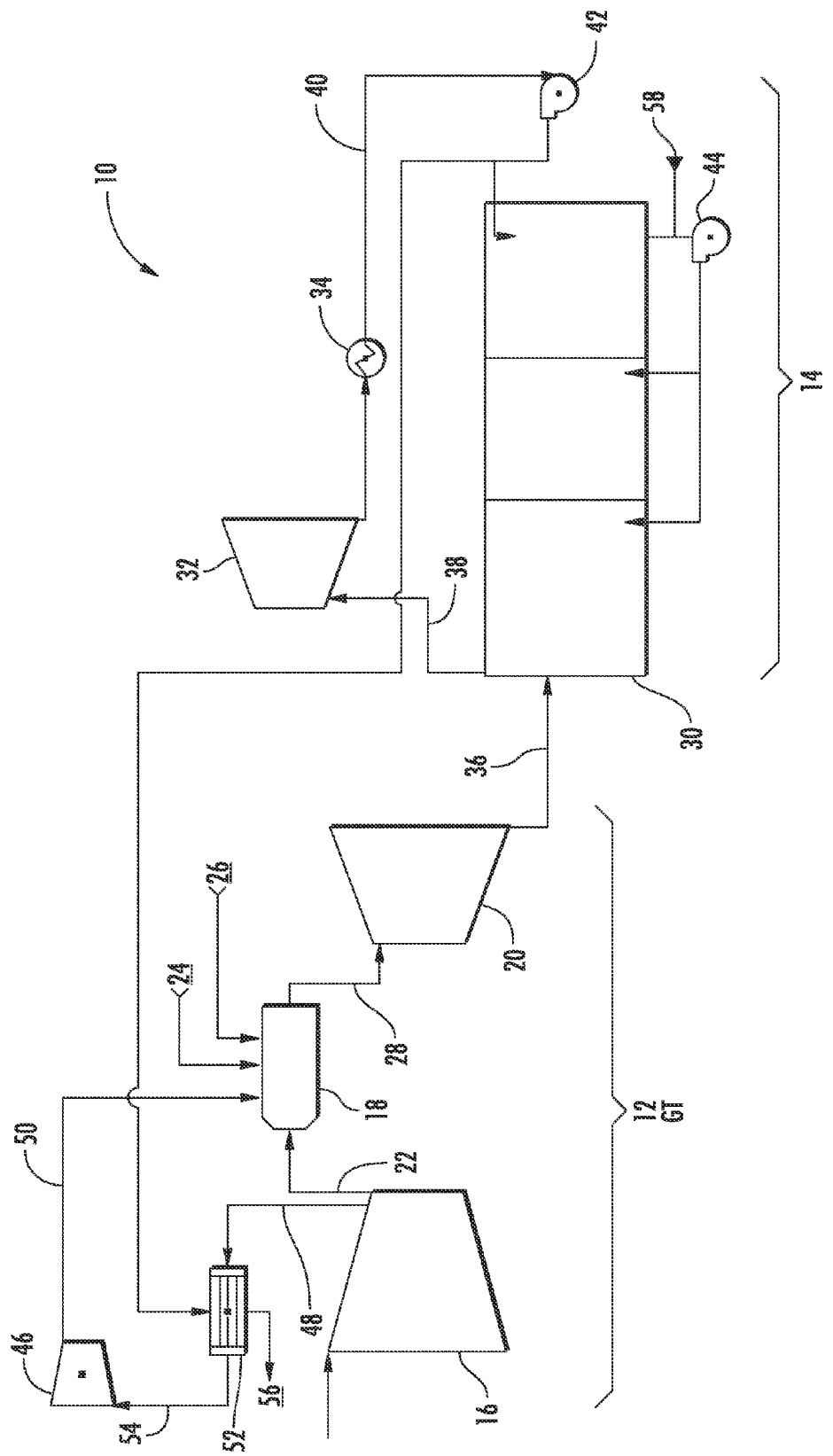

COMBINED CYCLE POWER AUGMENTATION BY EFFICIENT UTILIZATION OF ATOMIZING AIR ENERGY

FIELD OF THE INVENTION

The present invention generally involves a power plant that combines a conventional gas turbine with a heat recovery system to improve the overall efficiency of the combined cycle power plant. Specific embodiments of the present invention may include a regenerative heat exchanger that transfers heat from the gas turbine to the heat recovery system.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and stationary vanes and rotating blades in the compressor progressively impart kinetic energy to the working fluid (air) to produce a compressed working fluid at a highly energized state. The compressed working fluid exits the compressor and flows through nozzles in the combustors where it mixes with fuel and ignites to generate combustion gases having a high temperature, pressure, and velocity. The combustion gases flow to the turbine where they expand to produce work. For example, expansion of the combustion gases in the turbine may rotate a shaft connected to a generator to produce electricity.

The combustion gases exit the turbine, and, if released immediately to the environment, would result in wasted energy generated by the gas turbine that does not produce work. Therefore, a heat recovery system is often connected downstream of the turbine to receive the exhaust combustion gases from the turbine. The combination of the gas turbine and heat recovery system is commonly referred to as a combined cycle power plant. The heat recovery system typically includes a steam generator, a steam turbine, and a condenser. The exhaust combustion gases flow to the steam generator where they heat water to generate steam. The steam then flows through the steam generator where it expands to produce work. For example, expansion of the steam in the steam turbine may rotate a shaft connected to a generator to produce electricity. The shaft and generator may be the same shaft and generator connected to the gas turbine, or the gas turbine and heat recovery system may operate using separate shafts and generators. The condenser downstream of the steam generator condenses the steam to condensate, and condensate pumps direct the condensate back to the steam generator. The heat recovery system thus captures energy from the exhaust combustion gases before they are eventually released to the environment, thus increasing the overall efficiency of the combined cycle power plant.

The steam generator is typically located in or upstream of a vertical stack that allows the exhaust combustion gases to naturally rise across tubes in the steam generator to enhance steam generation. In some instances, a customer may limit the height of the vertical stack, resulting in a corresponding limit in the size of the steam generator and the amount of steam that it may produce. In addition, the gas turbine often includes one or more heat exchangers associated with auxiliary components, and the heat removed by these heat exchangers is often not recaptured, thus reducing the overall efficiency of the combined cycle power plant. Consequently, there is a need for systems that makes more efficient use of the heat extracted by the heat exchangers of auxiliary components while increasing steam generation, particularly in systems having vertical stacks of limited height.

BRIEF DESCRIPTION OF THE INVENTION

Aspects and advantages of the invention are set forth below in the following description, or may be obvious from the description, or may be learned through practice of the invention.

One embodiment of the present invention is a combined cycle power plant that includes a gas turbine having a first compressor, at least one combustor downstream of the first compressor, a turbine downstream of the combustor, and a second compressor downstream of the first compressor. A regenerative heat exchanger is between the first and second compressors, and a steam generator is downstream of the turbine and receives exhaust from the turbine. A steam turbine is downstream of the steam generator, and a condenser is downstream of the steam turbine and upstream of the steam generator. A first condensate pump is between the condenser and the steam generator and in fluid communication with the regenerative heat exchanger.

Another embodiment of the present invention is a combined cycle power plant that includes a gas turbine having a first compressor, a second compressor downstream of the first compressor, and a regenerative heat exchanger between the first and second compressors. A steam generator is downstream of the gas turbine and receives exhaust from the gas turbine. A closed loop cooling system through the regenerative heat exchanger and the steam generator transfers heat from the regenerative heat exchanger to the steam generator.

The present invention also includes a method for operating a combined cycle power plant that includes compressing a working fluid in a compressor and cooling the compressed working fluid with a regenerative heat exchanger so as to create a cooled compressed working fluid. The method further includes transferring heat from the regenerative heat exchanger to a steam generator.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a simplified block diagram of a combined cycle power plant according to one embodiment of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a simplified block diagram of a combined cycle power plant 10 according to one embodiment of the present invention. The combined cycle power plant 10 generally includes a gas turbine 12 connected to a heat recovery system 14 as is known in the art. For example, as shown in FIG. 1, the gas turbine 12 includes a first compressor 16, at least one combustor 18 downstream of the first compressor 16, and a turbine 20 downstream of the combustor 18. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A. The first compressor 16 produces a compressed working fluid 22 which flows to the combustor 18. The combustor 18 generally combines the compressed working fluid 22 with a supply of fuel 24 and/or diluent 26 and ignites the mixture to produce combustion gases 28. The supplied fuel 24 may be any suitable fuel used by commercial combustion engines, such as blast furnace gas, coke oven gas, natural gas, vaporized liquefied natural gas (LNG), propane, and any form of liquid fuel. The diluent 26 may be any fluid suitable for diluting or cooling the fuel, such as compressed air, steam, nitrogen, or another inert gas. The combustion gases 28 flow to the turbine 20 where they expand to produce work.

The heat recovery system 14 generally includes a steam generator 30, a steam turbine 32, and a condenser 34. The steam generator 30 is located downstream from the turbine 20, and exhaust combustion gases 36 from the turbine 20 flow through the steam generator 30 to produce steam 38. The steam turbine 32 is located downstream of the steam generator 30, and the steam 38 from the steam generator 30 expands in the steam turbine 32 to produce work. The condenser 34 is located downstream of the steam turbine 32 and upstream of the steam generator 30 and condenses the steam 38 from the steam generator 30 into condensate 40 which is returned to the steam generator 30. A first condensate pump 42 between the condenser 34 and the steam generator 30 is in fluid communication with the steam generator 30 to provide condensate 40 from the condenser 34 to the steam generator 30. In addition, a second condensate pump 44 may be present to increase the pressure of the condensate 40 supplied to subsequent stages of the steam generator 30.

Returning to the gas turbine 12 portion of the combined cycle power plant 10, the gas turbine 12 may further include a second compressor 46 downstream of the first compressor 16 and upstream of the combustor 18. The second compressor 46 receives a portion of the compressed working fluid 48 from the first compressor 16 and increases the pressure of the compressed working fluid 48 from the first compressor 16. The typical increase in pressure provided by the second compressor 46 is approximately 30 to 70%, although the actual increase in pressure is not a limitation of the invention unless recited in the claims. The output of the second compressor 46 may be referred to as atomizing air 50 and is injected into the combustor 18 with the fuel 24 and/or diluent 26 to atomize the mixture to enhance the efficiency of the combustion.

The portion of the compressed working fluid 48 supplied by the first compressor 16 to the second compressor 46 typically has a temperature on the order of 650 to 900° F. A closed loop cooling system between the gas turbine 12 and the heat recovery system 14 may be used to reduce the temperature of the portion of the compressed working fluid 48 supplied by the first compressor 16. As used herein, "a closed loop cooling system" is defined as any cooling system in which at least some coolant in the system flows in a repeating loop, including a system in which coolant is added to or removed from the loop. Specifically, a regenerative heat exchanger 52 may be located between the first and second compressors 16, 46 to remove heat from the portion of the compressed working fluid 48 supplied by the first compressor 16 to the second compressor 46. As used herein, the regenerative heat exchanger 52 includes any heat exchanger in which the heat removed by the heat exchanger is transferred to another component for use prior to release to the environment. The closed loop cooling system provides a fluid communication for a coolant, such as the condensate 40, to flow through and between the steam generator 30 and the regenerative heat exchanger 52. For example, as shown in FIG. 1, the first condensate pump 42 may supply the coolant (e.g., the condensate 40) through piping to the regenerative heat exchanger 52. As the coolant flows through the regenerative heat exchanger 52, it removes heat from the portion of the compressed working fluid 48 flowing through the regenerative heat exchanger 52 to the second compressor 46. For example, the regenerative heat exchanger 52 may reduce the temperature of the compressed working fluid 54 supplied to the second compressor 46 to less than 400°, 350°, 300°, or 250° F., as desired. After leaving the regenerative heat exchanger 52, at the point indicated by reference number 56, the coolant may then flow to the second condensate pump 44, at the point indicated by reference number 58. The second condensate pump 44 increases the pressure of the coolant and supplies the coolant to the steam generator 30. In this manner, the closed loop cooling system transfers heat from the regenerative heat exchanger 52 to the steam generator 30, thereby increasing the overall efficiency of the combined cycle power plant 10. In some embodiments, the amount of heat transferred from the regenerative heat exchanger 52 to the steam generator 30 may be capable of generating more than 200 to 650 kW of power.

One of ordinary skill in the art will readily appreciate that the combined cycle power plant 10 described and illustrated in FIG. 1 provides a method for operating the combined cycle power plant 10 at an improved efficiency. Specifically, the method includes compressing the working fluid in the first compressor 16 and cooling the compressed working fluid 48 with the regenerative heat exchanger 52 so as to create the cooled compressed working fluid 54. The method further includes transferring heat from the regenerative heat exchanger 52 to the steam generator 30 so that the heat removed by the regenerative heat exchanger 52 may be used to generate steam 38 and perform work. The steam 38 may then be condensed into condensate 40 and pumped through the closed loop cooling system through the regenerative heat exchanger 52 and steam generator 30. The cooled compressed working fluid 54 may be further compressed and supplied to the combustors 18 to atomize the fuel 24 and/or diluent 26 with the cooled compressed working fluid 50. Depending on the particular design needs, the method may result in transferring more than 200 to 650 kW of power from the regenerative the exchanger 52 to the steam generator 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A combined cycle power plant comprising:
   a. a gas turbine, wherein the gas turbine includes a first compressor, at downstream of the first compressor, mad a turbine downstream of the combustor;
   b. a second compressor downstream of the first compressor;
   c. a regenerative heat exchanger between the first and second compressors;
   d. a steam generator downstream of the turbine, wherein the steam generator receives exhaust from the turbine;
   e. a steam turbine downstream of the steam generator;
   f. a condenser downstream of the steam turbine and upstream of the steam generator; and
   g. a first condensate pump between the condenser and the steam generator, wherein the first condensate pump directly supplies condensate to the regenerative heat exchanger and the steam generator, wherein the condensate from the heat exchanger directly supplies to the steam generator.

2. The combined cycle power plant as in claim 1, wherein the second compressor is upstream of the combustor.

3. The combined cycle power plant as in claim 1, wherein the first condensate pump is in a closed loop cooling system, wherein the closed loop cooling system transfers heat from the regenerative heat exchanger to the steam generator.

4. The combined cycle power plant as in claim 1, further including a second condensate pump downstream of the regenerative heat exchanger.

5. The combined cycle power plant as in claim 4, wherein the first condensate pump produces a first discharge pressure and the second condensate pump produces a second discharge pressure and the second discharge pressure of the second condensate pump is greater than the first discharge pressure of the first condensate pump.

6. The combined cycle power plant as in claim 4, wherein the second condensate pump is in a closed loop cooling system, wherein the closed loop cooling system transfers heat from the regenerative heat exchanger to the steam generator.

7. A combined cycle power plant comprising:
   a. a gas turbine, wherein the gas turbine comprises a first compressor, a second compressor downstream of the first compressor, and a regenerative heat exchanger between the first and second compressors;
   b. a steam generator downstream of the gas turbine, wherein the steam generator receives exhaust from the gas turbine; and
   c. a closed loop cooling system having a fluid line directly connecting the regenerative heat exchanger to the steam generator, wherein the closed loop cooling system transfers heat from the regenerative heat exchanger to the steam generator through the fluid line.

8. The combined cycle power plant as in claim 7, further comprising a first condensate pump in the closed loop cooling system and upstream of the steam generator, wherein the first condensate pump supplies coolant to the regenerative heat exchanger.

9. The combined cycle power plant as in claim 7, further comprising a second condensate pump in the closed loop cooling system, wherein the second condensate pump receives coolant from the regenerative heat exchanger.

10. The combined cycle power plant as in claim 7, wherein the gas turbine comprises a combustor downstream of the second compressor.

11. The combined cycle power plant as in claim 7, wherein the gas turbine comprises a turbine upstream of the steam generator.

12. The combined cycle power plant as in claim 7, further comprising a steam turbine downstream of the steam generator.

13. The combined cycle power plant as in claim 12, further comprising a condenser downstream of the steam turbine and upstream of the steam generator.

* * * * *

UNITED STATES PATENT AND TRADEMARK OFFICE
CERTIFICATE OF CORRECTION

PATENT NO. : 8,141,336 B1
APPLICATION NO. : 12/877427
DATED : March 27, 2012
INVENTOR(S) : Joseph John et al.

Page 1 of 1

It is certified that error appears in the above-identified patent and that said Letters Patent is hereby corrected as shown below:

In the Claims

Claim 1, column 5, line 9 reads "compressor, at downstream of the first compressor, mad" it should read --compressor, a combustor downstream of the first compressor, and--

Signed and Sealed this
Fourteenth Day of May, 2013

Teresa Stanek Rea
*Acting Director of the United States Patent and Trademark Office*